Sept. 25, 1934.  M. O. DENTON  1,974,644
CULINARY DEVICE
Filed March 31, 1933
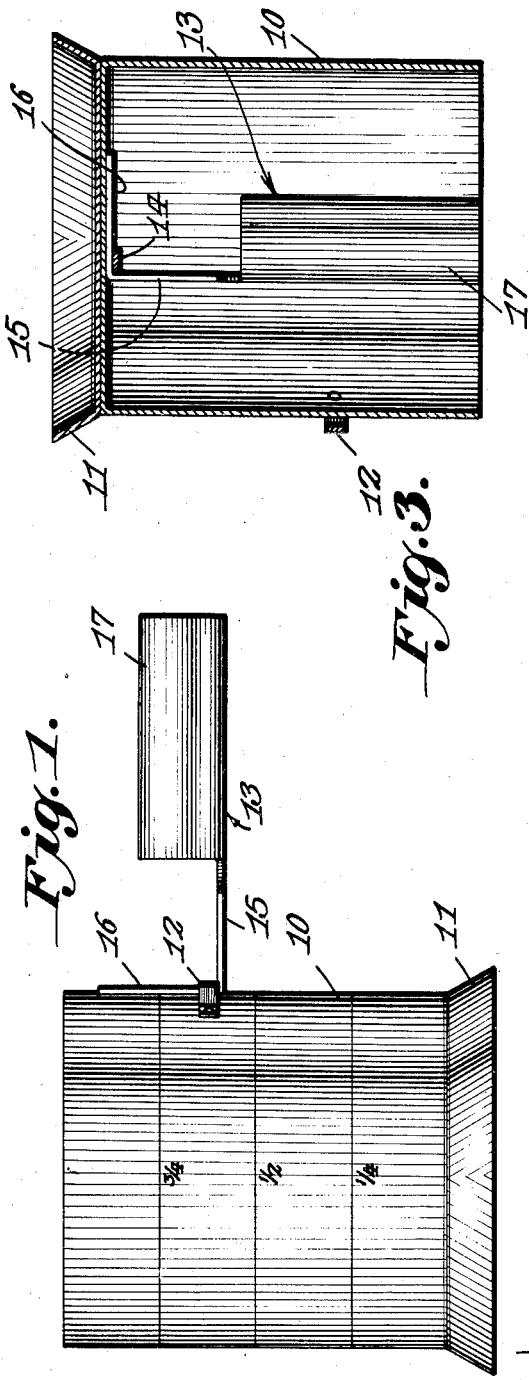
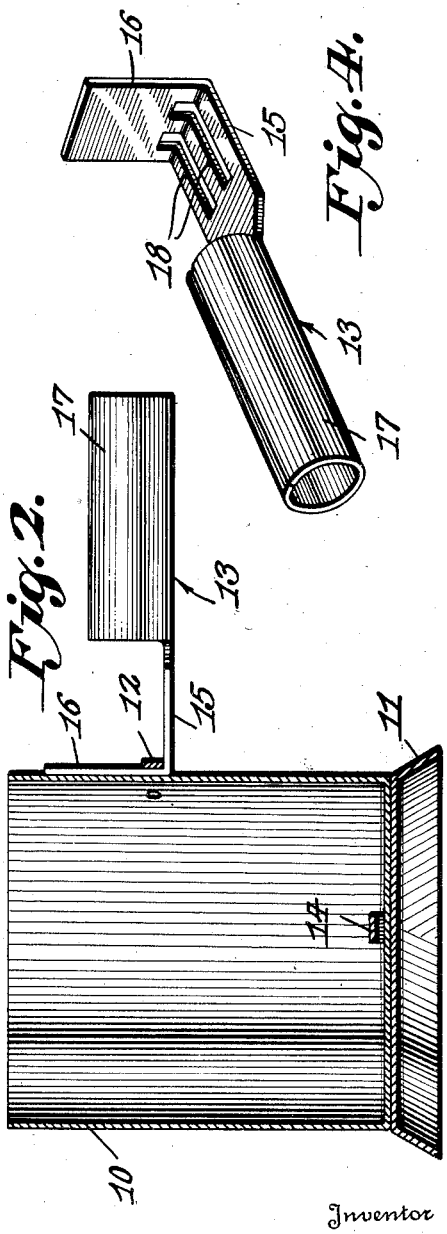
Inventor
M. O. Denton, Patented Sept. 25, 1934

1,974,644

UNITED STATES PATENT OFFICE 1,974,644

CULINARY DEVICE

Minnie O. Denton, Rome, Ga.

Application March 31, 1933, Serial No. 663,809

2 Claims. (Cl. 107—47)

This invention relates to new and useful improvements in culinary devices, and particularly to biscuit and doughnut cutters.

One object of the invention is to provide a device of this character which is simple in construction, and one which is readily capable of various adjustments to adapt the device for different uses.

Another object is to provide a device of this character wherein a handle member is adapted for various adjustments, with respect to the device, whereby to cooperate therewith, to perform different functions.

Other objects and advantages will be apparent from the following description when taken in connection with the accompanying drawing.

In the drawing:

Figure 1 is an elevation of the present invention, in condition for use as a measuring cup.

Figure 2 is a vertical sectional view through the device, in a plane parallel with that of Figure 1.

Figure 3 is a sectional view, similar to Figure 2, showing the handle member adjusted, whereby to render the device capable of use as a doughnut cutter.

Figure 4 is a perspective view of the handle member removed.

Referring particularly to the accompanying drawing, 10 represents a cylindrical receptacle, having external graduations, whereby to render the receptacle useful for measuring liquids or dry materials. Attached to the periphery of the closed end of the receptacle is a downwardly and outwardly flaring flange 11, the same being of a material somewhat stiffer than that of the body of the receptacle, whereby to prevent bending thereof, when being used to scrape soft or dried dough from the surface of a table, or kneading-board.

Secured to the outer face of the receptacle is a transversely extending loop member 12, for receiving the removable handle member, shown in detail in Figure 4, and designated as a whole by the numeral 13. Also secured to the bottom of the receptacle, within said receptacle, is an upwardly extending loop member 14, the same being arranged in the approximate center of said bottom. This handle member 13 includes an elongated flat body 15, one end of which is bent to extend at an angle thereto, as shown at 16, said end being adapted to engage in either of the loops 12 or 14, as will be more clearly explained later herein. The other end of the body 15 is rolled to form a longitudinally extending tubular member 17. Cut into the first-named end of the body 15, and extending longitudinally thereof, from the point of juncture of the extension 16 with said body, for a suitable distance in the direction of the tubular portion 17, are the slots 18, which are used to crimp the edges of a pie crust, as will be readily understood. Either of the side edge of the body portion 15 may be used for trimming off the edges of a pie crust.

When the invention is to be used for measuring liquids or dry materials, the operator attaches the handle member 13 to the receptacle, by inserting the extension 16 upwardly through the loop 12. Then by grasping the tubular portion 17, of the member 13, the receptacle may be lifted and carried.

When the invention is to be used as a biscuit cutter, the handle member is removed, and the receptacle 10 inverted, the operator then pressing the open end of the receptacle into a sheet of dough, to cut out the proper sized portions for biscuits.

When the device is to be used for cutting doughnuts, the operator inserts the extension 16, of the handle member beneath the loop 14, within the receptacle, so that said member will stand vertically and centrally therewithin, and by inverting the receptacle, and pressing the same into a sheet of dough, the open end of the receptacle will cut circular pieces from the dough, while at the same time the outer end of the tubular portion 17 cuts out the center of said dough piece, making the hole in the doughnut, as will be readily understood.

The device is also useful in cleaning a kneading-board by moving the receptacle, while in an upright position, over the surface of the board, so that the peripheral edge of the flange 11 will scrape therefrom any adhering portions of dough.

The receptacle is so constructed and proportioned that it may be engaged on the discharge spout of the flour bin of the ordinary kitchen cabinet, thereby taking the place of the ordinary cap, and providing a place for storing the device.

What is claimed is:

1. A culinary device comprising a measuring receptacle the open end of which is adapted to cut biscuits from a sheet of dough, a loop carried by the inner face of the bottom of said receptacle, a loop carried by the exterior of said receptacle, and a combined handle and doughnut center cutting member interchangeably engageable with said loops.

2. The combination with a receptacle having a loop secured externally thereto and a loop secured to the inner face of the bottom thereof, of a member having a flat end portion provided with a laterally extending portion adapted for interchangeable engagement with said loops, and having an end portion in tubular form.

MINNIE O. DENTON.